United States Patent
Cune et al.

(10) Patent No.: US 10,652,636 B2
(45) Date of Patent: *May 12, 2020

(54) DISTRIBUTED ANTENNA SYSTEM ARCHITECTURES

(71) Applicant: Corning Optical Communications LLC, Hickory, NC (US)

(72) Inventors: William Patrick Cune, Charlotte, NC (US); Bernhard Arthur Maria Deutsch, Hickory, NC (US); Jason Elliott Greene, Hickory, NC (US); Thomas Knuth, Berlin (DE)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/421,130

(22) Filed: May 23, 2019

(65) Prior Publication Data

US 2019/0289375 A1   Sep. 19, 2019

Related U.S. Application Data

(63) Continuation of application No. 16/164,085, filed on Oct. 18, 2018, now Pat. No. 10,349,156, which is a
(Continued)

(51) Int. Cl.
*H04B 10/2575* (2013.01)
*H04J 14/02* (2006.01)
(Continued)

(52) U.S. Cl.
CPC ... *H04Q 11/0071* (2013.01); *H04B 10/25752* (2013.01); *H04B 10/25753* (2013.01);
(Continued)

(58) Field of Classification Search
CPC ......... H04B 10/25753; H04B 10/25754; H04J 14/0246; H04J 14/025
See application file for complete search history.

(56) References Cited

U.S. PATENT DOCUMENTS

| | | |
|---|---|---|
| 6,871,081 B1 | 3/2005 | Llewellyn et al. |
| 7,254,330 B2 | 8/2007 | Pratt et al. |

(Continued)

FOREIGN PATENT DOCUMENTS

| | | |
|---|---|---|
| EP | 899976 A2 | 3/1999 |
| EP | 994582 A1 | 4/2000 |

(Continued)

OTHER PUBLICATIONS

International Search Report and Written Opinion PCT/US2013/037090 dated Jul. 22, 2013.

*Primary Examiner* — Nathan M Cors
(74) *Attorney, Agent, or Firm* — C. Keith Montgomery (57) ABSTRACT

Optical fiber-based wireless systems and related components and methods are disclosed. The systems support radio frequency (RF) communications with clients over optical fiber, including Radio-over-Fiber (RoF) communications. The systems may be provided as part of an indoor distributed antenna system (IDAS) to provide wireless communication services to clients inside a building or other facility. The systems incorporate various functions, such as optical network terminal (ONT), splitter, and local powering, in antenna coverage areas.

17 Claims, 6 Drawing Sheets

Related U.S. Application Data continuation of application No. 15/472,926, filed on Mar. 29, 2017, now Pat. No. 10,136,200, which is a continuation of application No. 14/518,574, filed on Oct. 20, 2014, now abandoned, which is a continuation of application No. PCT/US2013/037090, filed on Apr. 18, 2013.

(60) Provisional application No. 61/638,219, filed on Apr. 25, 2012.

(51) Int. Cl.
*H04Q 11/00* (2006.01)
*H04B 10/80* (2013.01)
*H04J 14/06* (2006.01)

(52) U.S. Cl.
CPC ..... *H04B 10/25754* (2013.01); *H04B 10/808* (2013.01); *H04J 14/025* (2013.01); *H04J 14/0246* (2013.01); *H04J 14/0278* (2013.01); *H04J 14/06* (2013.01); *H04Q 2011/0016* (2013.01)

(56) References Cited

U.S. PATENT DOCUMENTS

| | | |
|---|---|---|
| 7,565,080 B2 | 7/2009 | Mickelsson et al. |
| 7,672,591 B2 | 3/2010 | Soto et al. |
| 8,073,329 B2 | 12/2011 | Gao et al. |
| 8,107,815 B2 | 1/2012 | Akasaka et al. |
| 8,351,792 B2 | 1/2013 | Zheng |
| 8,374,508 B2 | 2/2013 | Soto et al. |
| 8,422,883 B2 | 4/2013 | Yen et al. |
| 8,452,178 B2 | 5/2013 | Gao et al. |
| 8,488,966 B2 | 7/2013 | Zheng |
| 2005/0058451 A1 | 3/2005 | Ross |
| 2006/0045524 A1 | 3/2006 | Lee et al. |
| 2006/0182446 A1 | 8/2006 | Kim et al. |
| 2008/0063397 A1 | 3/2008 | Hu et al. |
| 2008/0260389 A1 | 10/2008 | Zheng |
| 2009/0097855 A1* | 4/2009 | Thelen ............ H04B 10/25752 398/115 |
| 2010/0014868 A1 | 1/2010 | McGlynn et al. |
| 2010/0142955 A1 | 6/2010 | Yu et al. |
| 2010/0150556 A1 | 6/2010 | Soto et al. |
| 2010/0158525 A1 | 6/2010 | Walter |
| 2011/0083152 A1 | 4/2011 | Centore, III et al. |
| 2011/0268446 A1* | 11/2011 | Cune ............ H04B 10/25753 398/79 |
| 2012/0134673 A1 | 5/2012 | Palanisamy et al. |
| 2012/0257893 A1 | 10/2012 | Boyd et al. |

FOREIGN PATENT DOCUMENTS

| | | | |
|---|---|---|---|
| WO | 0209363 A2 | 1/2002 | |
| WO | 20111139942 A1 | 11/2011 | |
| WO | 2011152831 A1 | 12/2011 | |
| WO | WO2011/152831 | * 12/2011 | ........... H04B 10/155 |

* cited by examiner

FIG. 6

DISTRIBUTED ANTENNA SYSTEM ARCHITECTURES

PRIORITY APPLICATION

This application is a continuation of U.S. patent application Ser. No. 16/164,085, filed Oct. 18, 2018, which is a continuation of U.S. patent application Ser. No. 15/472,926, filed Mar. 29, 2017, now U.S. Pat. No. 10,136,200, which is a continuation of U.S. patent application Ser. No. 14/518,574, filed on Oct. 20, 2014, now abandoned, which is a continuation of International Application No. PCT/US13/37090, filed on Apr. 18, 2013, which claims the benefit of priority to U.S. Provisional Application No. 61/638,219, filed on Apr. 25, 2012, where are hereby incorporated herein by reference.

BACKGROUND

Field of the Disclosure

The technology of the disclosure relates to distributed antenna systems and alternative powering and connectivity architectures therefor.

Technical Background

Wireless communication is rapidly growing, with increasing demands for high-speed mobile data communication. "Wireless fidelity" or "WiFi" systems and wireless local area networks (WLANs) are being deployed in many different types of areas to communicate with wireless devices called "clients," "client devices," or "wireless client devices." Distributed antenna systems are particularly useful when deployed inside buildings or other indoor environments where client devices may not otherwise be able to receive radio frequency (RF) signals from a source.

One approach to deploying a distributed communications system involves the use of RF antenna coverage areas, or "antenna coverage areas." Antenna coverage areas can have a relatively short range from a few meters up to twenty meters. Combining a number of access point devices creates an array of antenna coverage areas. Because the antenna coverage areas each cover small areas, there are typically only a few users per antenna coverage area. This minimizes the amount of bandwidth shared among users.

One type of distributed communications system for creating antenna coverage areas, called "Radio-over-Fiber" or "RoF," utilizes RF signals sent over optical fibers. Such systems can include a head-end station optically coupled to multiple remote antenna units that each provide antenna coverage areas. The remote antenna units each include RF transceivers coupled to an antenna to transmit RF signals wirelessly, wherein the remote antenna units are coupled to the head-end station via optical fiber links.

It may be desired to provide such optical fiber-based distributed communications systems indoors, such as inside a building or other facility, to provide indoor wireless communication for clients. In such cases, power for the remote antenna units on each floor is often provided from an intermediate distribution frame (IDF) at each floor. Because the remote antenna units may be located at long distances from the IDF, power must be also conveyed over long distances from the IDF to the antenna units. Long power transmission distances lead to high voltage drops, which increases the power requirements for the IDF, as well as the voltage ratings for the transmission cables.

SUMMARY OF THE DETAILED DESCRIPTION

One embodiment of the disclosure relates to a wireless communication system comprising a head end unit and at least one remote at least one remote unit coupled to the head end unit by an optical communication path. The remote unit comprises at least one antenna system, each antenna system being capable of transmitting radio frequency (RF) signals into a coverage area, and an optical network terminal (ONT) component. The ONT component is capable of terminating one or more optical fibers and demultiplexing optical signals into component parts. According to one aspect, the remote unit can be coupled to a power source within the coverage area so that power need not be conveyed over long distances to the remote unit.

An additional embodiment of the disclosure relates to a wireless communication system comprising a head end unit, at least one remote unit coupled to the head end unit by an optical communication path, and at least one ONT optically coupled and electrically coupled to the at least one remote unit. The remote unit comprises a plurality of antenna systems, each antenna system being capable of transmitting RF signals into a coverage area, and a splitter component with at least one input fiber and a plurality of output fibers. The splitter component is capable of routing optical RF data transmissions to the antenna systems.

Yet another embodiment relates to a wireless communication system comprising a head end unit and at least one remote unit coupled to the head end unit by a remote unit optical communication path. The at least one remote unit comprises at least one antenna system capable of transmitting RF signals into a coverage area. The system further comprises at least one ONT optically coupled to the head end unit by an ONT optical communication path, and electrically coupled to a corresponding remote unit. The optical communication paths comprise a splitter component with at least one input fiber and a plurality of output fibers, the splitter component being capable of routing optical RF data transmissions to the at least one remote unit.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

DETAILED DESCRIPTION

The present embodiments combine various cable and hardware infrastructures to address requirements of distributed antenna systems (DAS), fiber-to-the-home (FTTH), multiple dwelling units (MDU), and passive optical LAN (POL). Alternative powering concepts are disclosed, such as using multiple POL or FTTH terminal locations (wall outlet, optical network terminal "ONT", etc.) to provide distributed power sources. The disclosed embodiments combine selected DAS cabling and hardware infrastructures with FTTH, MDU, and POL infrastructures. This arrangement can be used to reduce cost and complexity while eliminating the need for parallel cabling and hardware solutions.

Figure 1:
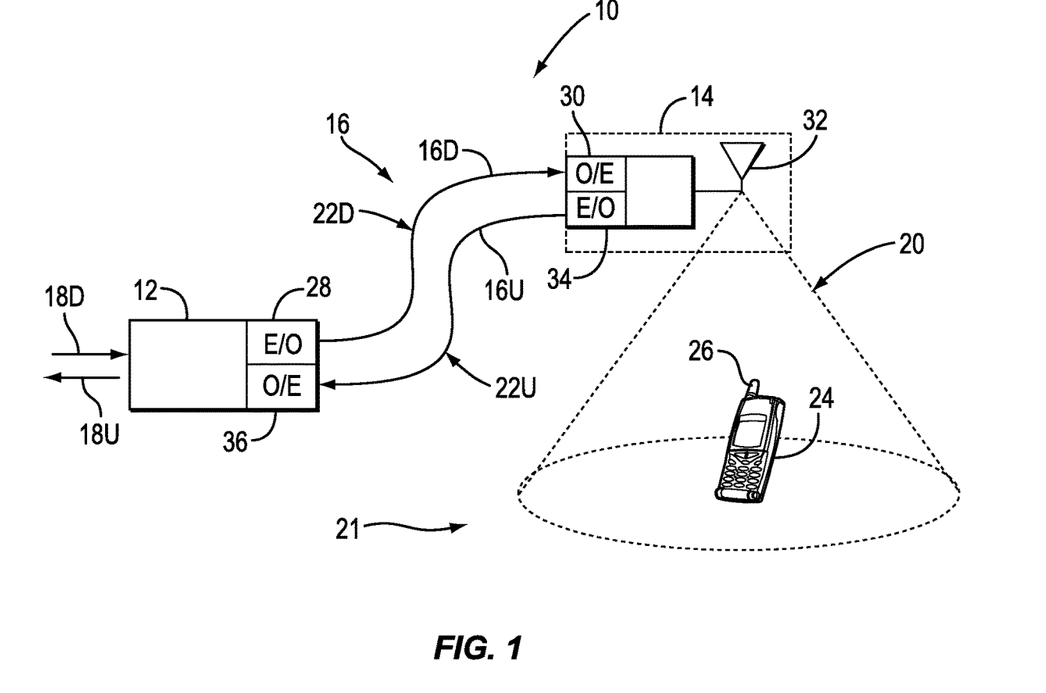
FIG. 1 is a schematic diagram of an exemplary optical fiber-based wireless infrastructure.

FIG. 1 is a schematic diagram of an embodiment of an optical fiber-based distributed antenna system, or "DAS". In this embodiment, the system is an optical fiber-based DAS 10 that is configured to create antenna coverage areas for establishing communications with wireless client devices located in the antenna coverage areas. The optical fiber-based DAS 10 provides RF communications services (e.g., cellular services). The DAS 10 includes head end equipment in the form of a head-end unit (HEU) 12, one or more remote antenna units (RAUs) 14, and an optical fiber 16 that optically couples the HEU 12 to the RAU 14. The HEU 12 is configured to receive communications over downlink electrical RF communications signals 18D from sources, such as a network or carrier, and provide such communications to the RAU 14. The HEU 12 is also configured to return communications received from the RAU 14, via uplink electrical RF communications signals 18U, back to the source or sources. The optical fiber 16 includes at least one downlink optical fiber 16D to carry signals communicated from the HEU 12 to the RAU 14 and at least one uplink optical fiber 16U to carry signals communicated from the RAU 14 back to the HEU 12. One downlink optical fiber 16D and one uplink optical fiber 16U could be provided to support multiple channels each using wavelength-division multiplexing (WDM), as discussed in U.S. patent application Ser. No. 12/892,424.

The antenna coverage area or service area 20 of the RAU 14 forms an RF coverage area 21 substantially centered about the RAU 14. The HEU 12 is adapted to perform a number of wireless applications, including but not limited to Radio-over-Fiber (RoF), radio frequency identification (RFID), wireless local-area network (WLAN) communication, public safety, cellular, telemetry, and other mobile or fixed services. Shown within the antenna service area 20 is a client device 24 in the form of a mobile device which may be a cellular telephone. The client device 24 can be any device that is capable of receiving RF communication signals. The client device 24 includes an antenna 26 (e.g., a wireless card) adapted to receive and/or send electromagnetic RF communications signals.

With continuing reference to FIG. 1, to communicate the electrical RF communications signals over the downlink optical fiber 16D to the RAU 14, to in turn be communicated to the client device 24 in the antenna coverage area 20, the HEU 12 includes an electrical-to-optical (E/O) converter 28. The E/O converter 28 converts the downlink electrical RF communications signals 18D to downlink optical RF communications signals 22D to be communicated over the downlink optical fiber 16D. The RAU 14 includes an optical-to-electrical (O/E) converter 30 to convert received downlink optical RF communications signals 22D back to electrical RF communications signals to be communicated wirelessly through an antenna 32 of the RAU 14 to client devices 24 in the coverage area 20. Similarly, the antenna 32 receives wireless RF communications from client devices 24 and communicates electrical RF communications signals representing the wireless RF communications to an E/O converter 34 in the RAU 14. The E/O converter 34 converts the electrical RF communications signals into uplink optical RF communications signals 22U to be communicated over the uplink optical fiber 16U. An O/E converter 36 provided in the HEU 12 converts the uplink optical RF communications signals 22U into uplink electrical RF communications signals, which can then be communicated as uplink electrical RF communications signals 18U back to a network or other source.

Figure 2:
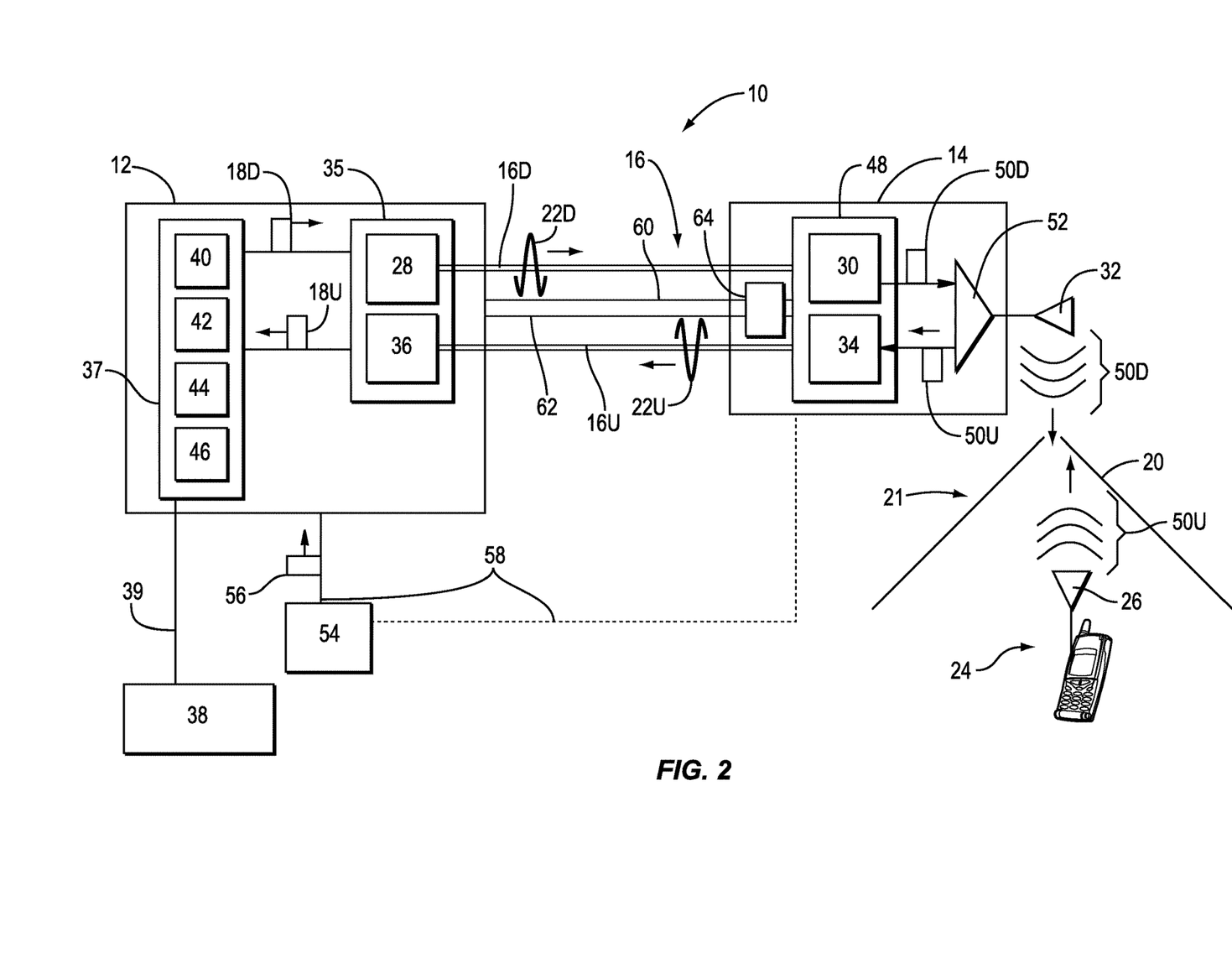
FIG. 2 is a more detailed schematic diagram of exemplary head end equipment and a remote antenna unit (RAU) that can be deployed in the wireless infrastructure of FIG. 1.

FIG. 2 is a more detailed schematic diagram of the DAS 10 of FIG. 1. In this embodiment, the HEU 12 includes a service unit 37 that provides electrical RF service signals by passing such signals from one or more outside networks 38 via a network link 39. In another embodiment, the service unit 37 provides electrical RF service signals by generating the signals directly. In another exemplary embodiment, the service unit 37 coordinates the delivery of the electrical RF service signals between client devices 24 within the antenna coverage area 20. The service unit 37 is electrically coupled to the E/O converter 28 that receives the downlink electrical RF communications signals 18D from the service unit 37 and converts them to corresponding downlink optical RF communications signals 22D.

The HEU 12 also includes the O/E converter 36, which is electrically coupled to the service unit 37. The O/E converter 36 receives the uplink optical RF communications signals 22U and converts them to corresponding uplink electrical RF communications signals 18U. The service unit 37 in the HEU 12 can include an RF communications signal conditioner unit 40 for conditioning the downlink electrical RF communications signals 18D and the uplink electrical RF communications signals 18U, respectively. The service unit 37 can include a digital signal processing unit ("digital signal processor" or "DSP") 42 for providing to the RF communications signal conditioner unit 40 an electrical signal that is modulated onto an RF carrier to generate a desired downlink electrical RF communications signal 18D. The DSP 42 is also configured to process a demodulation signal provided by the demodulation of the uplink electrical RF communications signal 18U by the RF communications signal conditioner unit 40. The service unit 37 in the HEU 12 can also include a central processing unit (CPU) 44 for processing data and otherwise performing logic and computing operations, and a memory unit 46 for storing data.

The RAU 14 also includes a converter pair 48 comprising the O/E converter 30 and the E/O converter 34. The O/E converter 30 converts the received downlink optical RF communications signals 22D from the HEU 12 back into downlink electrical RF communications signals 50D. The E/O converter 34 converts uplink electrical RF communications signals 50U received from the client device 24 into the uplink optical RF communications signals 22U to be communicated to the HEU 12. The O/E converter 30 and the E/O converter 34 are electrically coupled to the antenna 32 via an RF signal-directing element 52, such as a circulator. The RF signal-directing element 52 directs the downlink electrical RF communications signals 50D and the uplink electrical RF communications signals 50U.

With continuing reference to FIG. 2, the DAS 10 also includes a power supply 54 that generates an electrical power signal 56. The power supply 54 is electrically coupled to the HEU 12 for powering the power-consuming elements therein. In an exemplary embodiment, an electrical power line 58 runs through the HEU 12 and over to the RAU 14 to power the O/E converter 30 and the E/O converter 34 in the converter pair 48, the optional RF signal-directing element 52 (unless the RF signal-directing element 52 is a passive device), and any other power-consuming elements provided. The electrical power line 58 can include two wires 60 and 62 that carry a single voltage and that are electrically coupled to a DC power converter 64 at the RAU 14. The DC power converter 64 is electrically coupled to the O/E converter 30 and the E/O converter 34 in the converter pair 48, and changes the voltage or levels of the electrical power signal 56 to the power level(s) required by the power-consuming components in the RAU 14.

Figure 3:
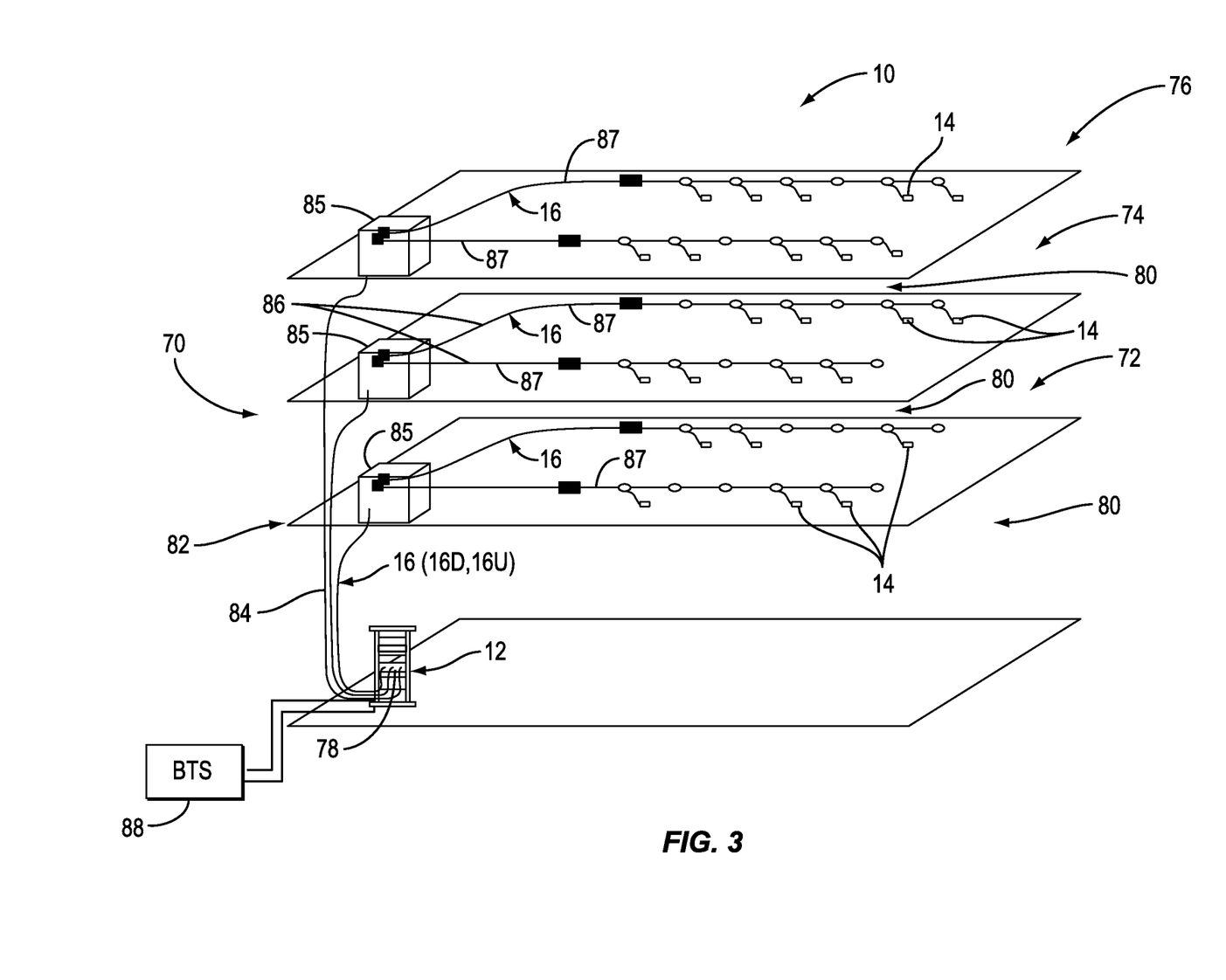
FIG. 3 is a partially schematic cut-away diagram of an exemplary building infrastructure in which the wireless infrastructure in FIG. 1 can be employed.

FIG. 3 is a partially schematic cut-away diagram of a building infrastructure 70 employing an optical fiber-based DAS. The DAS 10 incorporates the HEU 12 to provide various types of communication services to coverage areas within the building infrastructure 70. The DAS 10 is configured to receive wireless RF communications signals and convert the signals into RoF signals to be communicated over the optical fiber 16 to multiple RAUs 14 to provide wireless services inside the building infrastructure 70. The building infrastructure 70 includes a first (ground) floor 72, a second floor 74, and a third floor 76. The floors 72, 74, 76 are serviced by the HEU 12 through a main distribution frame 78 to provide antenna coverage areas 80 in the building infrastructure 70. A main cable 82 has a number of different sections that facilitate the placement of a large number of RAUs 14 in the building infrastructure 70. Each RAU 14 in turn services its own coverage area in the antenna coverage areas 80. The main cable 82 can include, for example, a riser cable 84 that carries all of the downlink and uplink optical fibers 16D, 16U to and from the HEU 12. The riser cable 84 may be routed through an interconnect unit (ICU) 85. The ICU 85 may be provided as part of or separate from the power supply 54 in FIG. 2. The ICU 85 may also provide power to the RAUs 14 via the electrical power line 58 (FIG. 2) and provided inside an array cable 87.

An RF source such as a base transceiver station (BTS) 88, which may be provided by a second party such as a cellular service provider, is connected to the HEU 12. A BTS is any station or source that provides an input signal to the HEU 12 and can receive a return signal from the HEU 12. In a typical cellular system, for example, a plurality of BTSs are deployed at a plurality of remote locations to provide wireless telephone coverage. Each BTS serves a corresponding cell and when a mobile station enters the cell, the BTS communicates with the mobile station. The DAS 10 in FIGS. 1-3 provides point-to-point communications between the HEU 12 and the RAU 14. Each RAU 14 communicates with the HEU 12 over a distinct downlink and uplink optical fiber pair to provide the point-to-point communications. Multiple downlink and uplink optical fiber pairs can be provided in a fiber optic cable to service multiple RAUs 14 from a common fiber optic cable. The DAS can support a wide variety of radio sources, such as Long Term Evolution (LTE), US Cellular (CELL), Global System for Mobile Communications (GSM), Code Division Multiple Access (CDMA), Time Division Multiple Access (TDMA), Advanced Wireless Services (AWS), iDEN (e.g., 800 Mega-Hertz (MHz), 900 MHz, and 1.5 GHz), etc. These radios sources can range from 400 MHz to 2700 MHz as an example.

Figure 4:
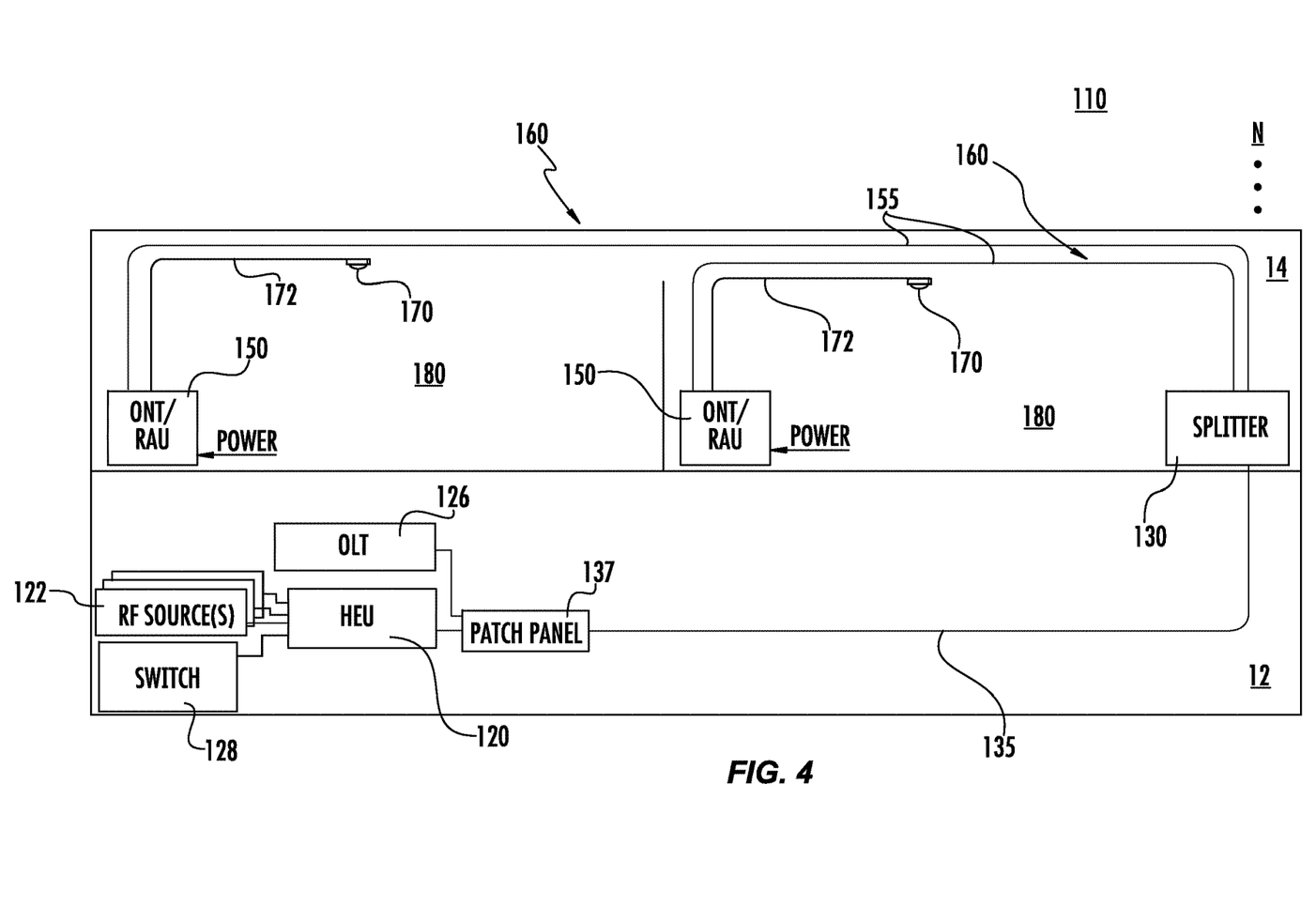
FIG. 4 is a schematic diagram of an exemplary optical fiber-based wireless infrastructure in which antenna unit and ONT functionalities are collocated.

FIG. 4 is a schematic diagram of a generalized embodiment of wireless system, in the form of an optical fiber-based distributed antenna system 110. In this embodiment, the optical fiber-based wireless system 110 is configured to create one or more coverage areas in a building infrastructure. The building infrastructure comprises multiple stories, including a first floor 112, which can be, for example, a ground or basement floor, a second floor 114, and N additional floors (not illustrated). According to one aspect, remote antenna unit (RAU) and optical network terminal (ONT) functionalities are collocated at a remote unit. According to another aspect, power for the remote unit can be provided 'locally', such as at the coverage area of the remote unit.

The components and operation of the system 110 in providing RF communications and data services can otherwise be generally similar to the embodiment shown in FIGS. 1-3. For example, the optical fiber-based wireless system 110 includes a head-end unit (HEU) 120 adapted to perform or to facilitate any one of a number of RoF applications, such as radio frequency (RF) identification (RFID), wireless local-area network (WLAN) communication, cellular phone services, etc., as in the HEU 12 illustrated in FIG. 3. The HEU 120 can be connected to one or more RF sources 122, such as a base transceiver station (BTS) through an interface, integral with a BTS, or otherwise in communication with a BTS, to receive downlink electrical RF signals from the BTS 122 and to transmit RF signals to the BTS 122.

The HEU 120 can also be connected to an optical line terminal 126 (OLT), and a switch 128, such as an Ethernet switch, to provide additional services to the building infrastructure. The HEU 120 is connected to a splitter 130 by a cable 135 and a patch panel 137. The cable 135 can be, for example, a riser cable having one or more optical fibers. According to one aspect of the present embodiment, the splitter 130 is connected to a plurality of ONT/remote antenna units ("ONT/RAU"), or simply, 'remote units' 150 by cables 155. The splitter 130 has least one input fiber and a plurality of output fibers, and is capable of routing optical RF data transmissions based on at least one of signal wavelength and polarization. The cables 135, 155 can be, for example, optical cables having one or more optical fibers. The cables 135, 155 can generally be referred to as 'optical communication paths', and the cables 135, 155, as well as the splitter 130, form optical communication paths 160 from the HEU 120 to the remote units 150. Additional transmission media, such as sections of optical cable, can be included in the optical transmission paths 160. A continuous fiber communication path may therefore extend from the each remote unit 150, through the splitter 130, back to the patch panel 137, and to the OLT 126 and the HEU 120.

The remote units 150 each include an uplink/downlink antenna system 170 connected by cable 172, which can be, for example, an electrically conductive coaxial cable. The antenna systems 170 provide uplink/downlink for RF communication, data, etc. service signals in a coverage area 180. The remote units 150 can include the components and functionalities of the RAUs 14 illustrated in FIGS. 1-3, For example, the remote units 150 may include an optical-to-electrical (O/E) converter to convert received downlink optical RF communications signals to electrical RF communications signals to be communicated wirelessly through the antenna system 170 to client devices in its coverage area. Similarly, the antenna system 170 receives wireless RF communications from client devices and communicates electrical RF communications signals representing the wireless RF communications to an E/O converter in the remote units 150. The E/O converter converts the electrical RF communications signals into uplink optical RF communications signals to be communicated to an O/E converter provided in the HEU 120 for further transmission by the HEU. The remote units 150 also include an ONT component effective to terminate one or more fiber optic lines, demultiplex optical signals into their component parts (e.g., voice telephone, television, and Internet), and to provide electrical power.

In the illustrated embodiment, each coverage area or service area 180 can coincide with, for example, an individual living unit in a multiple dwelling unit (MDU), or some other delineation between spaces in a building infrastructure, such as an office. At the remote units 150, the functionalities and hardware of a remote antenna unit and the ONT may be collocated and/or combined into a single chassis. Power for both the RAU and ONT components in the remote unit 150 can be provided at the desk (e.g., POL level) or living unit level (e.g., FTTH MDU), within the individual living unit, or other location where a network device is terminated and has power available. Power thus need not be provided at each floor in a wiring closet, IDF, etc., and conveyed over long lengths of cable resulting in electrical losses. Power is instead transmitted over electrically conductive network cables over relatively short distances. The remote unit 150 can be located, for example, such that it can be connected to a wall outlet in the living unit of an MDU, such that power for a remote unit 150 may be delivered from the coverage area of the remote unit.

Figure 5:
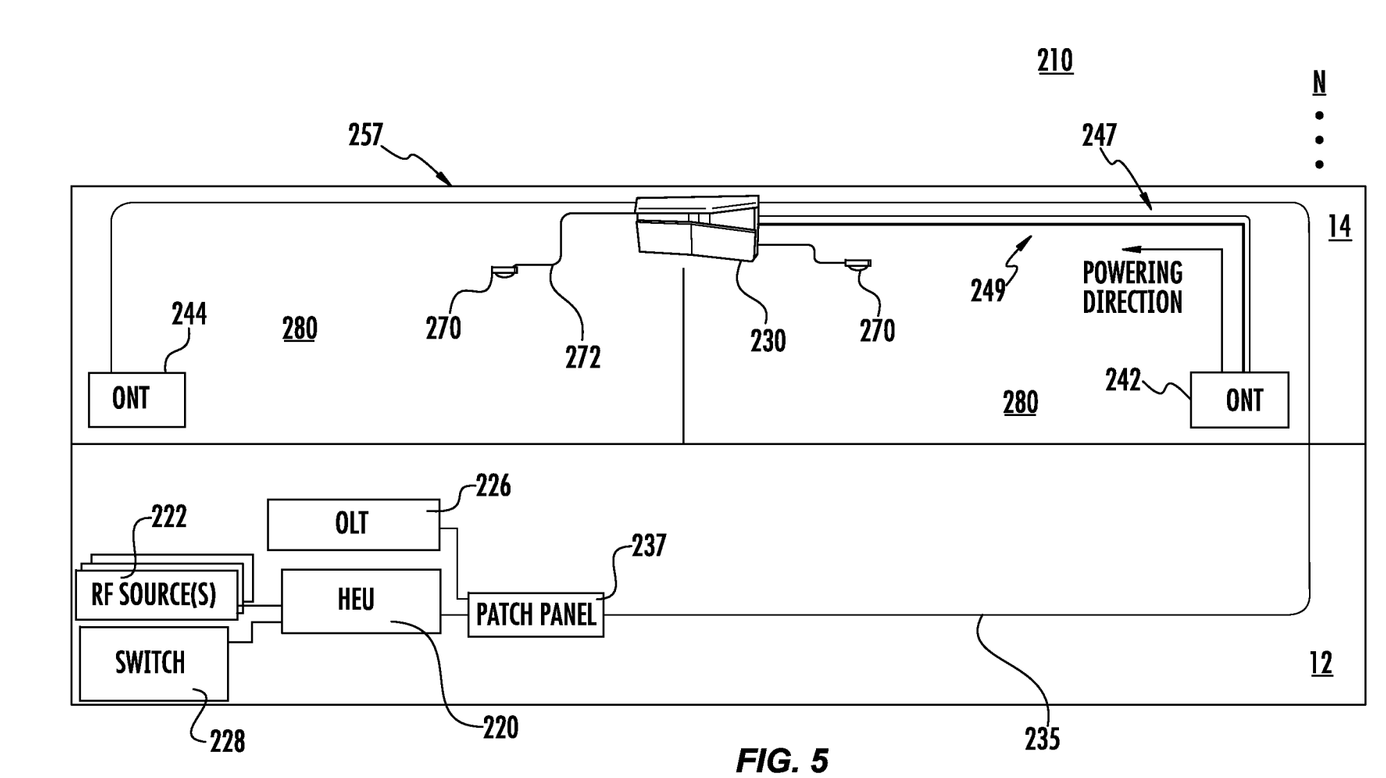
FIG. 5 is a schematic diagram of an exemplary optical fiber-based wireless infrastructure in which the antenna unit and splitter functionalities are collocated.

FIG. 5 is a schematic view of another embodiment of a wireless system, in the form of an optical fiber-based distributed antenna system 210. The building infrastructure comprises multiple stories, including a first floor 112, which can be a ground or basement floor, a second floor 114, and N additional floors (not illustrated). According to one aspect, remote antenna unit (RAU) and splitter functionalities are collocated, such as combined in a single chassis, frame and/or platform. According to another aspect, power for the remote unit can be provided locally, such as at a coverage area of the remote unit, or in one or more of the coverage areas of the remote unit.

The components and operation of the system 210 in providing RF communications and data services can otherwise be generally similar to the embodiment shown in FIGS. 1-3. For example, the optical fiber-based wireless system 210 includes an HEU 220 adapted to perform or to facilitate any one of a number of RoF applications, such as RFID, WLAN communication, cellular phone services, etc., as in the HEU 12 illustrated in FIG. 3. The HEU 220 can be connected to one or more RF sources 222, such as a BTS through an interface, integral with a BTS, or otherwise in communication with a BTS, to receive downlink electrical RF signals from the BTS 222 and to transmit RF signals to the BTS 222. The HEU 220 can also be connected to an OLT 226, and a switch 228, such as an Ethernet switch, to provide additional services to the building infrastructure.

The HEU 220 is connected to a remote antenna/splitter unit 230, or simply 'remote unit' 230, by a cable 235 and a patch panel 237. The cable 235 can be, for example, an optical transmission path comprising a cable or cables having one or more optical fibers suited for riser and/or horizontal (e.g. duct) deployments. In the illustrated embodiment, the cable 235 extends in sections vertically through the building as well as horizontally, and may be comprised of multiple sections joined, for example, at an interconnect unit (not illustrated).

According to one aspect of the present embodiment, the remote antenna/splitter unit, or remote unit 230 is connected to a first ONT 242 by a fiber path 247 and by an electrical path 249. The fiber path 247 can comprise, for example, a fiber optic cable with one or more optical fibers for transporting data. The electrical path 249 can comprise one or more electrical conductors for providing data and/or electrical power to the antenna/splitter unit 230. The fiber path 247 and the electrical path 249 can be combined, for example in a single, composite optical fiber/electrical cable having one or more optical and electrical conductors. The remote unit 230 can also be connected to a second ONT 244 by a fiber optic communication path 257. A continuous fiber communication path may therefore extend from the ONT 244, through the remote unit 230, back to the patch panel 237, and to the OLT 226 and the HEU 220. Similarly, a continuous fiber optical communication path may extend from the ONT 242, through the remote unit 230, back to the patch panel 237, and to the OLT 226 and the HEU 220.

The remote antenna/splitter unit 230 includes one or more uplink/downlink antenna systems 270 connected by cable 272, which can be, for example, an electrically conductive coaxial cable. Each antenna system 270 provides uplink/downlink for RF communicating service signals into a respective coverage area 280. The remote units 230 may include an optical-to-electrical (O/E) converter to convert received downlink optical RF communications signals to electrical RF communications signals to be communicated wirelessly through two or more antenna systems 270 to client devices in the respective coverage areas of the antenna systems. Similarly, each antenna system 270 receives wireless RF communications from client devices in its coverage area and communicates electrical RF communications signals representing the wireless RF communications to an E/O converter in the remote unit 230. The E/O converter converts the electrical RF communications signals into uplink optical RF communications signals to be communicated to an O/E converter provided in the HEU 220 for further transmission by the HEU. Because the remote unit 230 includes multiple antenna systems 270, it may include additional processing capabilities, converters etc., to accommodate the additional data and/or RF communications into multiple coverage areas.

The remote antenna/splitter unit 230 also includes at least one splitter component (not illustrated). The splitter component has least one input fiber and a plurality of output fibers, and is capable of routing optical RF data transmissions based on at least one of signal wavelength and polarization. Optical data signals entering an input fiber can be transmitted through one or more of the output fibers. Accordingly, the remote unit 230 can route RF and/or data transmissions (based on wavelength, polarization, or other factors) to the ONTs 242, 244, as well as multiple antenna systems 270, to provide service to multiple coverage areas 280 in multiple living units. In the illustrated embodiment, the exemplary remote unit 230 routes RF and/or data transmissions to two antenna systems 270, although three, four, or more antenna systems 270 can be provided with transmissions from the remote unit 230.

The combined antenna/splitter chassis consolidates the splitter function and antenna functions at a single location. Accordingly, a single chassis, frame, or platform can be used to provide optical communications to the ONTs, and to provide RF signals for transmission to multiple antenna systems 270 in separate living units. In addition, the remote unit 230 can be located in the infrastructure where the power for the remote unit 230 can be provided from the ONT 242, or alternatively, from the ONT 244. The coverage areas 280 illustrated in FIG. 5 can be, for example, coverage areas corresponding to adjacent living or work spaces, such as in an MDU or office. Accordingly, antenna systems 270, as well as ONTs 242, 244, can be located in adjacent coverage areas and connected to a common remote unit 230.

Figure 6:
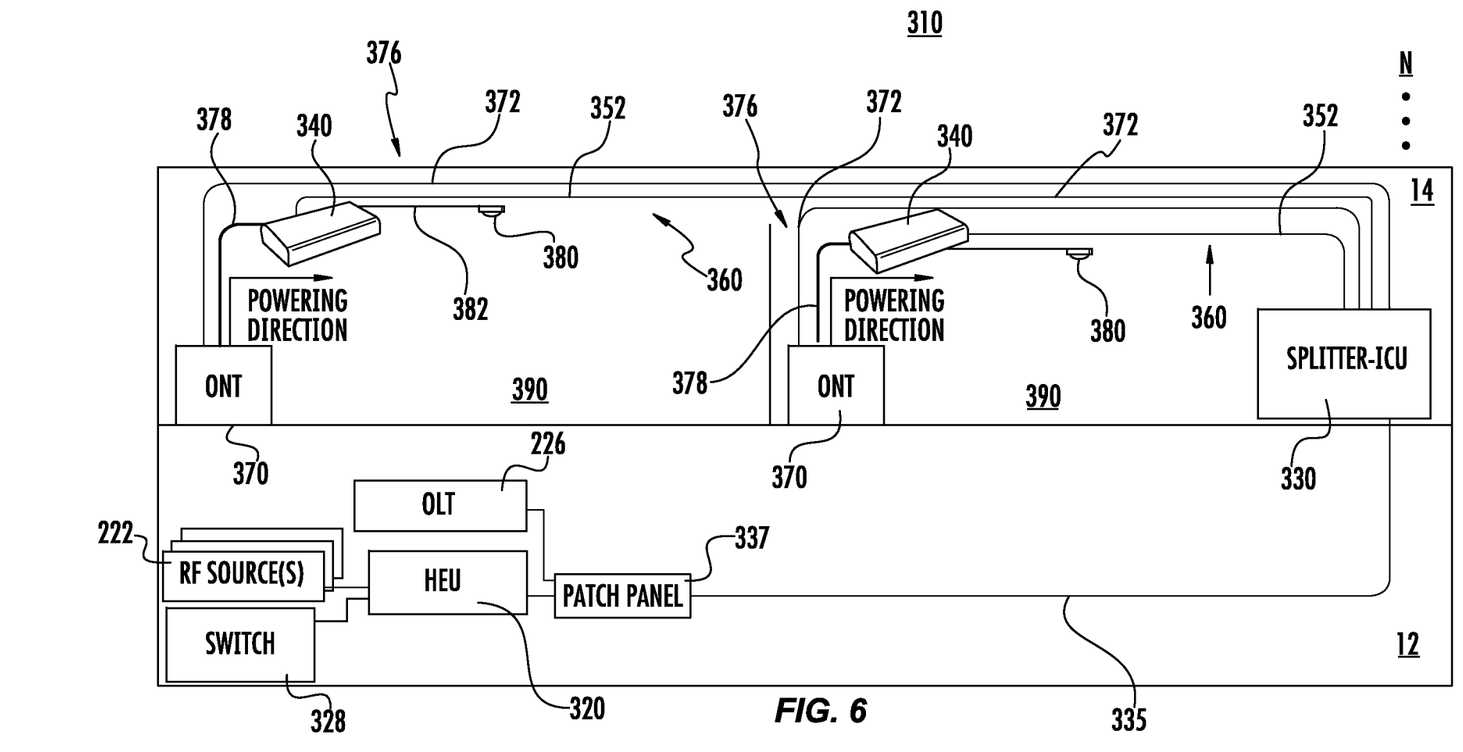
FIG. 6 is a schematic diagram of an exemplary optical fiber-based wireless infrastructure in which ONT and antenna functionalities are located proximate to one another and the antenna is powered from the ONT.

FIG. 6 is a schematic diagram of yet another generalized embodiment of wireless system, in the form of an optical fiber-based distributed antenna system 310. In this embodiment, the optical fiber-based wireless system 310 is configured to create one or more coverage areas in a building infrastructure. According to one aspect, a power cable may be run from an ONT to a nearby remote unit, thus eliminating the need for a composite cable and an interconnect unit (ICU) to inject electrical power for remote units on each floor. The components and operation of the system 310 in providing RF communications and data services can otherwise be generally similar to the embodiment shown in FIGS. 1-3. The HEU 320 can be connected to one or more RF sources 322, such as a base transceiver station (BTS) through an interface, integral with a BTS, or otherwise in communication with a BTS, to receive downlink electrical RF signals from the BTS 322 and to transmit RF signals to the BTS 322.

The HEU 120 can also be connected to an OLT 326, and a switch 328, such as an Ethernet switch, to provide additional services to the building infrastructure. The HEU 320 is connected to a splitter/fiber distribution component 330 by a cable 335 and a patch panel 337. The cable 335 can be, for example, a riser cable having one or more optical fibers. According to one aspect of the present embodiment, the splitter/fiber distribution component 330 is connected to a plurality of remote antenna units, or simply, 'remote units' 340 by cables 352. The cables 352 can be, for example, optical cables having one or more optical fibers. The cables 335, 352 can generally be referred to as 'optical communication paths', and the cables 335, 352, as well as the splitter/fiber distribution component 330, form optical communication paths 360 from the HEU 320 to each remote unit 340. Additional transmission media, such as sections of optical cable, can be included in the optical transmission paths 360. The splitter/fiber distribution component 330 has least one input fiber and a plurality of output fibers, and is capable of routing optical RF data transmissions based on at least one of signal wavelength and polarization.

The splitter/fiber distribution component 330 is also connected to a plurality ONTs 370 by cables 372. The cables 372 may be optical fiber cables, and the cables 372, along with the splitter/fiber distribution component 330 and the cable 335, form an optical communication path 376 from the HEU 320 to each ONT 370. Each ONT 370 can be electrically connected to a nearby remote unit 340 by an electrically conductive cable 378 having one or more electrical conductors.

As shown in FIG. 6, a continuous optical communication path is formed from each ONT 370, through the splitter/fiber distribution component 330, back to the patch panel 337, the HEU 320, and the OLT 326. Similarly, a continuous optical communication path is formed from each remote unit 340, through the splitter/fiber distribution component 330, back to the patch panel 337, the HEU 320, and the OLT 326.

According to one aspect, for the ONTs 370 and remote units 340 on a particular floor of the infrastructure, the ONT optical communication paths and remote unit optical communication path can run through a common splitter component. The splitter component need not be formed from a single optical splitter, but can be part of a group of collocated splitters. A single splitter component can alternatively connect to ONTs and remote units on multiple floors, such as on adjacent floors.

The remote units 340 each include an uplink/downlink antenna system 380 connected by cable 382, which can be, for example, an electrically conductive coaxial cable. The antenna systems 380 provide uplink/downlink for RF communication, data, etc. service signals in a coverage area 390. The remote units 340 may each include an optical-to-electrical (O/E) converter to convert received downlink optical RF communications signals to electrical RF communications signals to be communicated wirelessly through the antenna system 380 to client devices in its respective coverage area. Similarly, the antenna system 380 receives wireless RF communications from client devices and communicates electrical RF communications signals representing the wireless RF communications to an E/O converter in the remote units 340. The E/O converter converts the electrical RF communications signals into uplink optical RF communications signals to be communicated to an O/E converter provided in the HEU 320 for further transmission by the HEU.

The ONTs 370 are effective, for example, to terminate one or more fiber optic lines, and to demultiplex optical signals into their component parts (e.g., voice telephone, television, and Internet).

According to one aspect, the functionalities and hardware of a remote antenna unit and an optical network terminal are collocated, for example in a coverage area 390, so that the ONT 370 can power a nearby RAU 340 by an electrical cable. Therefore, there is no need to install a composite cable between an interconnect unit (ICU) at an intermediate distribution frame (IDF) and a remote unit. Power for the ONT, and thus the corresponding RAU, can be instead be provided at the desk (POL level) or living unit level (FTTH MDU), for each remote unit 340, within the individual living unit, office, commercial space, and similar infrastructure subdivisions. Power thus need not conveyed over long lengths of cable resulting in electrical losses.

In the embodiments illustrated in FIGS. 4-6, only a first floor 112 and a second floor 114 are illustrated. For each of the disclosed embodiments, it is to be understood that the arrangement on the second floor 114 may be repeated on N additional floors of the building, with the HEU servicing multiple floors. It should be further understood that while only two units (e.g., living unit, office unit, commercial unit, and other infrastructure subdivisions) with two coverage areas are shown for the second floor 114, three, four, or more living units can be included in any and all of the disclosed embodiments.

According to the various embodiments as disclosed in this specification, power for DAS components can be provided 'locally', such as from a coverage area of a DAS component, or an adjacent subdivision of a building infrastructure. Long power transmission distances from interconnect units (ICU) to DAS remote units can thus be reduced and/or eliminated. Because power need not be injected from an ICU, there is also no need for composite cable connections from an ICU to remote units as fiber only cables will suffice. The integration of ONT functions with DAS components also reduces installation by eliminating the need for parallel cable and hardware infrastructures. The footprint for hardware in IDF closets is also reduced.

In the illustrated embodiments, the wireless communication systems are described as adapted to receive RF communications from RF sources such as BTSs. Other signal sources can provide RF and other communication data to the illustrated wireless systems, including bidirectional amplifiers (BDA), Femtocells, etc.

While the computer-readable medium may be as a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor.

The terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like.

The antenna arrangements may include any type of antenna desired, including but not limited to dipole, monopole, and slot antennas. The distributed antenna systems that employ the antenna arrangements disclosed herein could include any type or number of communications mediums, including but not limited to electrical conductors, optical fiber, and air (i.e., wireless transmission). The distributed antenna systems may distribute and the antenna arrangements disclosed herein may be configured to transmit and receive any type of communications signals, including but not limited to RF communications signals and digital data communications signals, examples of which are described in U.S. patent application Ser. No. 12/892,424.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A wireless communication system deployed in a multiple dwelling unit (MDU), comprising:
 a head end unit configured to electronically receive and convert input downlink radio frequency (RF) signals received from at least one source to optical downlink RF signals to be distributed on an optical communication path comprising a plurality of optical fiber cables and at least one splitter component;
 an optical line terminal (OLT) configured to receive and distribute optical multiplexed data signals on the optical communication path;
 at least one optical network terminal (ONT) component located proximate to at least one remote unit and configured to demultiplex the optical multiplexed data signals into component parts;
 a plurality of remote units distributed over multiple floors of the MDU, each remote unit being coupled to the head end unit and the OLT by the optical communication path to receive the optical downlink RF signals and the optical multiplexed data signals from the head end unit and the OLT, each remote unit of the plurality of remote units configured to receive power delivered from an electrical power source located in a respective coverage area of one or more of the plurality of the remote units, wherein each remote unit comprises an optical-to-electrical converter configured to convert the received optical downlink RF signals to output electrical downlink RF signals;
 a plurality of antennas, at least one antenna being associated with each remote unit and being configured to distribute the output electrical downlink RF signals into a respective coverage area of its associated remote unit; and
 an electrically conductive cable connecting the at least one ONT component to at least one of the plurality of remote units, the electrically conductive cable configured to provide power from the at least one ONT component to the at least one remote unit.

2. The wireless communication system deployed in an MDU of claim 1, wherein the wireless communication system comprises a remote unit for each of a plurality of delineated spaces in the MDU, and wherein the wireless communication system comprises a plurality of electrical power sources not located in any of the plurality of remote units.

3. The wireless communication system deployed in an MDU of claim 2, wherein a respective one of the plurality of electrical power sources is associated with each of the plurality of delineated spaces and is configured to deliver power to a respective remote unit in a respective one of the plurality of delineated spaces.

4. The wireless communication system deployed in an MDU of claim 3, wherein the plurality of remote units comprises at least five remote units deployed on at least three floors of the MDU, and wherein the wireless communication system comprises an electrical power source for each remote unit being located in the respective one of the plurality of delineated spaces for the respective remote unit.

5. The wireless communication system deployed in an MDU of claim 3, wherein the at least one splitter component comprises at least one input fiber and a plurality of output fibers, the at least one splitter component being capable of routing the optical downlink RF signals and the optical multiplexed data signals based on at least one of wavelength and polarization.

6. The wireless communication system deployed in an MDU of claim 5, wherein the optical communication path comprises a riser cable comprising a plurality of optical fibers and deployed between the head end unit and the at least one splitter component, and wherein the plurality of optical cables connects the at least one splitter component to the plurality of remote units, wherein each remote unit is coupled to the at least one splitter component by at least one optical fiber.

7. The wireless communication system deployed in an MDU of claim 3, further comprising a plurality of electrically conductive cables connecting the at least one ONT component to respective electrical power sources, whereby the at least one ONT component provides power received from the respective electrical power sources to one or more of the plurality of remote units.

8. A wireless communication system deployed in a multiple dwelling unit (MDU), comprising:
    a head end unit configured to electronically receive and convert input downlink radio frequency (RF) signals received from at least one source to optical downlink RF signals to be distributed on an optical communication path comprising a plurality of optical fiber cables and at least one splitter component;
    an optical line terminal (OLT) configured to receive and distribute optical multiplexed data signals on the optical communication path;
    at least one optical network terminal (ONT) component located proximate to at least one remote unit and configured to demultiplex the optical multiplexed data signals into component parts;
    a plurality of remote units distributed over at least three floors of the MDU, each remote unit being coupled to the head end unit and the OLT by the optical communication path to receive the optical downlink RF signals and the optical multiplexed data signals from the head end unit and the OLT, each remote unit of the plurality of remote units configured to receive power delivered from an electrical power source located in a respective coverage area of one or more of the plurality of the remote units, wherein each remote unit comprises an optical-to-electrical converter configured to convert the received optical downlink RF signals to output electrical downlink RF signals;
    a plurality of antennas, at least one antenna being associated with each remote unit and being configured to distribute the output electrical downlink RF signals into a respective coverage area of its associated remote unit;
    an electrically conductive cable connecting the at least one ONT component to at least one of the plurality of remote units, the electrically conductive cable configured to provide power from the at least one ONT component to the at least one remote unit; and
    a plurality of electrical power sources not located in any of the plurality of remote units, wherein the optical communication path comprises a riser cable comprising a plurality of optical fibers.

9. The wireless communication system deployed in an MDU of claim 8, wherein the at least one splitter component comprises at least one input fiber and a plurality of output fibers, the at least one splitter component being capable of routing the optical downlink RF signals and the optical multiplexed data signals based on at least one of wavelength and polarization.

10. A wireless communication system deployed in an MDU configured to electronically receive and convert input electrical downlink radio frequency (RF) signals received from at least one source to optical downlink RF signals to be distributed on an optical communication path and comprising:
    an optical line terminal (OLT) configured to receive and distribute optical multiplexed data signals on the optical communication path, the optical communication path including at least one splitter component with at least one input fiber and a plurality of output fibers, the at least one splitter component being capable of routing the optical downlink RF signals and the optical multiplexed data signals based on at least one of wavelength and polarization;
    at least one optical network terminal (ONT) component located proximate to at least one remote unit and configured to demultiplex the optical multiplexed data signals into component parts;
    a plurality of remote units distributed over multiple floors of the MDU, each remote unit being coupled to the OLT by the optical communication path to receive the optical downlink RF signals and the optical multiplexed data signals, each remote unit of the plurality of remote units configured to receive power delivered from an electrical power source located in a respective coverage area of one or more of the plurality of the remote units, wherein each remote unit comprises an optical-to-electrical converter configured to convert the received optical downlink RF signals to output electrical downlink RF signals;
    a plurality of antennas, at least one antenna being associated with each remote unit and being configured to distribute the output electrical downlink RF signals into a respective coverage area of its associated remote unit; and
    an electrically conductive cable connecting the at least one ONT component to at least one remote unit of at least one of the plurality of remote units, the electrically conductive cable configured to provide power from the at least one ONT component to the at least one remote unit.

11. The wireless communication system deployed in an MDU of claim 10, wherein the wireless communication system comprises a remote unit for each of a plurality of delineated spaces in the MDU.

12. The wireless communication system deployed in an MDU of claim 11, wherein the wireless communication system comprises a plurality of electrical power sources not located in any of the plurality of remote units, and wherein a respective one of the plurality of electrical power sources is associated with each of the plurality of delineated spaces and is configured to deliver power to a respective remote unit in a respective one of the plurality of delineated spaces.

13. The wireless communication system deployed in an MDU of claim 11, wherein the plurality of remote units comprises at least five remote units deployed on at least three floors of the MDU, and wherein the wireless communication system comprises an electrical power source for each remote unit being located in the respective one of the plurality of delineated spaces for the respective remote unit.

14. The wireless communication system deployed in an MDU of claim 13, further comprising at least one electrically conductive cables connecting the at least one ONT component to respective electrical power sources, whereby the at least one ONT component provides power received from the respective electrical power sources to one or more of the plurality of remote units.

15. A wireless communication system deployed in an MDU configured to receive and convert input downlink radio frequency (RF) signals received from at least one source to optical downlink RF signals to be distributed on an optical communication path and comprising:

an optical line terminal (OLT) configured to receive and distribute optical multiplexed data signals on the optical communication path;

at least one optical network terminal (ONT) component located proximate to at least one remote unit and configured to demultiplex the optical multiplexed data signals into component parts;

a plurality of remote units distributed over at least three floors of the MDU, each remote unit being coupled to the OLT by the optical communication path to receive the optical downlink RF signals and the optical multiplexed data signals, each remote unit of the plurality of remote units configured to receive power delivered from an electrical power source located in a respective coverage area of one or more of the plurality of the remote units, wherein each remote unit comprises an optical-to-electrical converter configured to convert the received optical downlink RF signals to output electrical downlink RF signals;

an electrical power source associated with each remote unit;

at least one antenna associated with at least one of the remote units and configured to distribute the output electrical downlink RF signals into a respective coverage area of the remote unit; and at least one electrically conductive cable connecting the at least one ONT component to at least one remote unit of at least one of the plurality of remote units, the electrically conductive cable configured to provide power from the at least one ONT component to the at least one remote unit, wherein the optical communication path comprises a riser cable deployed between the head end unit and at least one splitter component.

16. The wireless communication system deployed in an MDU of claim 15, wherein the at least one splitter component comprises at least one input fiber and a plurality of output fibers, the at least one splitter component being capable of routing the optical downlink RF signals and the optical multiplexed data signals based on at least one of wavelength and polarization.

17. The wireless communication system deployed in an MDU of claim 15, further comprising a plurality of electrically conductive cables connecting the at least one ONT component to respective electrical power sources, whereby the at least one ONT component provides power received from the respective electrical power sources to one or more of the plurality of remote units.

* * * * *